Feb. 7, 1950     L. D. CAHILL     2,496,577
OIL PRESSURE REGULATOR
Filed Nov. 1, 1945
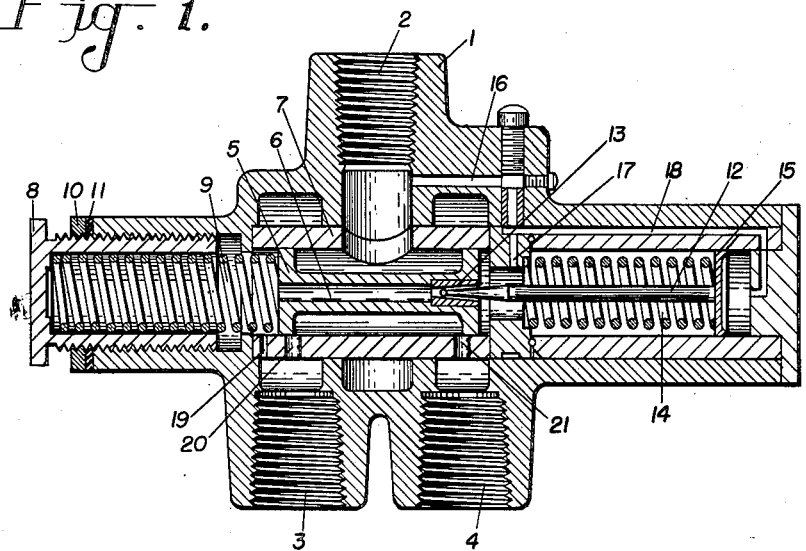
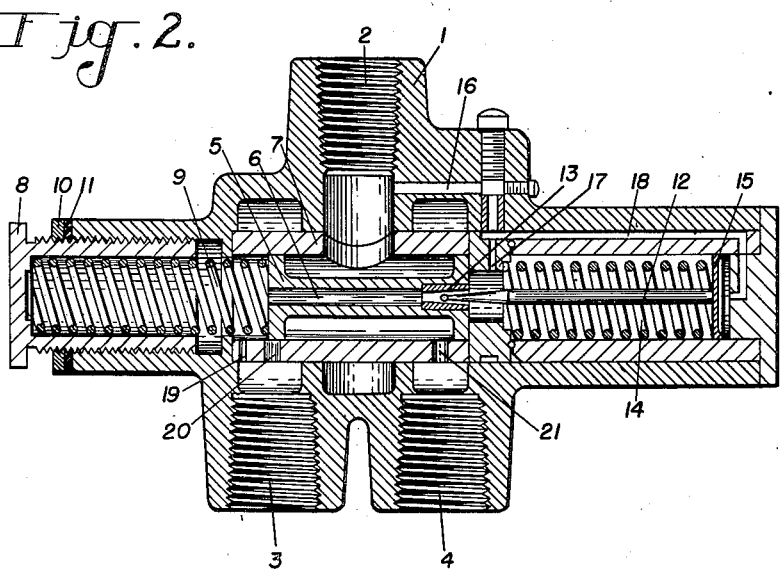
INVENTOR.
LYSLE D. CAHILL
BY
*Frank H. Harmon*
ATTORNEY

UNITED STATES PATENT OFFICE

2,496,577

OIL PRESSURE REGULATOR

Lysle D. Cahill, Shaker Heights, Ohio, assignor, by mesne assignments, to Jack & Heintz Precision Industries, Inc., Cleveland, Ohio, a corporation of Delaware Application November 1, 1945, Serial No. 626,097

4 Claims. (Cl. 137—153)

This invention relates to pressure regulators and has for a primary object to provide an automatic means for maintaining the pressure constant in an hydraulic system at any desired setting.

A more particular object is to provide an oil pressure regulator for automatically maintaining constant pressure in an hydraulic system such as used in aircraft automatic pilots.

With the foregoing and other objects in view the invention resides in the combination of parts and in the details of construction hereinafter set forth in the following specification and appended claims, certain embodiments thereof being illustrated in the accompanying drawings, in which:

Figure 1 is a cross sectional view of the regulator with a setting that would normally direct about half the pressure fluid to the system and by-pass the other half to the sump;

Figure 2 is similar to Figure 1 except the setting is such that system pressure would be a maximum.

Referring more particularly to the drawings a housing 1 is shown as having an inlet port 2, a by-pass port 3 and a system port 4. A sliding spool valve 5, having an internal passage 6 is shown held within cylinder 7 of housing 1. An adjustable threaded plug 8 is provided for varying the tension on spool valve 5 by means of a spring 9. Plug 8 is held in any adjusted position by means of a lock nut 10. A gasket 11 is inserted between nut 10 and housing 1 to prevent leakage.

On the opposite side of the spool 5 from plug 8 is a needle valve 12 which is in alignment with and extends partially into the internal passage 6 of spool 5. Valve 12 is normally held in an unseated position with respect to a valve seat 13 in passage 6 by means of a spring 14 which engages a cap 15 on valve 12.

A passage 16 in the housing 1 diverts a part of the pressure fluid from port 2 into passages 17 and 18, which direct the flow to the needle valve end of spool 5, and to the back of cap 15 on valve 12 respectively. A passage 19 is provided in cylinder 7 to allow flow into sump port 3. Two additional passages 20 and 21 are shown in cylinder 7 leading into ports 3 and 4 respectively.

In operation the regulator is installed in an hydraulic system with the high pressure line connected to inlet port 2, the sump line to by-pass port 3, and the system line to port 4. By making either clockwise or counterclockwise adjustment of plug 8 the system pressure may be either raised or lowered to a desired level. Variations in the pressure of the fluid coming in port 2 necessitate a rapid regulating means to maintain that desired level constant.

In Figure 1 assume spool 5 to be in an adjusted position by means of nut 8 for a desired system pressure at port 4. The two end portions of spool 5 are shown as partially covering passages 20 and 21. A decrease in pressure at intake port 2 would make it necessary for spool 5 to move so as to decrease the opening at passage 20 and to increase the opening at passage 21 in order to maintain a constant pressure at system port 4. Constant pressure at port 4 would also be obtainable conversely for an increase in pressure at port 2. Figure 2 represents an extreme condition where the pressure at intake port 2 dropped enough to cause spool 5 to move so as to completely block passage 20 and fully open passage 21.

Movement of spool 5 is automatically controlled by means of needle valve 12 which moves toward or away from its seat 13 in spool 5 with increasing or decreasing variations in the intake pressure. An increase in pressure is transmitted along passages 16 and 18 to valve cap 15 and valve 12 will move toward its seat 13. A decrease in pressure is handled by spring 14 which always tends to move valve 12 away from seat 13.

Passage 17 is used as a means for transmitting fluid from passage 16 to the valve end of spool 5.

Therefore, when an increase in pressure occurs at intake port 2 valve 12 will move toward seat 13 restricting the opening to passage 6 of spool 5, as shown in Figure 1. A pressure will build up behind the valve end of the spool 5 and the spool will move against spring 9 proportional to the increase in pressure, the opening of passage 21 being decreased and the system pressure at port 4 being maintained constant.

When a decrease in pressure occurs at port 2, valve 12 will move, under actuation by spring 14, away from seat 13 enlarging the opening to passage 6, as shown in Figure 2. This allows for a decrease in pressure at the valve end of the spool and spring 9 will move spool 5 proportional to the decrease in pressure, enlarging the opening at passage 21 to maintain the system pressure constant.

A regulator as described and claimed herein is particularly adaptable to aircraft automatic pilot systems where close regulation is required to prevent over or under control due to surges or drops in the main hydraulic system pressure.

I claim:

1. An hydraulic pressure regulator for maintaining constant pressure in a system comprising a housing, an intake port and two outlet ports in said housing, a cylinder integral with said housing between the intake port and the outlet ports, the intake port leading directly into said cylinder, two passages in the cylinder wall leading to one outlet port, a third passage in the cylinder wall leading to the second outlet port, a sliding tubular spool valve with a needle valve seat in one end of its tubular portion located within the cylinder, a spring engaging said valve at one end, a threaded plug engaging the housing for adjusting the tension on said spring, a needle valve mounted in the housing axially with respect to the spool valve on the opposite side of said valve from the adjustable plug, pressure responsive means for urging said needle valve into its seat, a spring for normally opposing engagement of said needle valve with its seat in the tubular portion of the spool valve, a cap on said spring and said needle valve, a passage in the housing to permit fluid to flow from the intake port to the needle valve end of the spool, and a second passage to permit fluid to flow from the intake port to the cap on the needle valve.

2. In an hydraulic pressure regulator for maintaining constant pressure in a system, a sliding spool valve for simultaneously regulating the amount of flow to a system and the amount by-passed in combination with a needle valve and an adjustable spring, said spring and needle valve being mounted axially with respect to but on opposite sides of said spool valve for controlling the position of the sliding spool valve and opposed resilient means and fluid pressure means for actuating said needle valve means.

3. In an hydraulic pressure regulator for maintaining a constant pressure in a system, an inlet port, a by-pass outlet port and a system outlet port, sliding valve means for controlling simultaneously the amount of flow to each of the outlet ports, resilient means responsive to decreases in intake pressure for moving said sliding means so as to increase the flow to the system port, and decrease the flow to the by-pass port, said needle valve means being responsive to increases in intake pressure and means for moving the sliding means so as to decrease the flow to the system port and increase the flow to the by-pass port and opposed fluid pressure means and resilient means for actuating said needle valve means.

4. In an hydraulic pressure regulator for maintaining a constant pressure in a system, an inlet port, a by-pass outlet port and a system outlet port, a sliding spool valve for controlling simultaneously the amount of flow to each of the outlet ports, a passage through the center of said spool valve, a needle valve seat in one end of said passage, a needle valve means and opposed fluid pressure means and resilient means for actuating said needle valve means for controlling the flow through the spool passage by moving toward or away from its seat in the passage automatically with increases or decreases in intake pressure respectively, and causing increases or decreases in pressure at the end of the spool valve, an adjustable resilient means under compression engaging the end of said spool valve opposite the needle valve for controlling the position of the spool valve cooperatively with said needle valve thereby maintaining a flow to the system port which will keep the system pressure constant.

LYSLE D. CAHILL.

REFERENCES CITED

The following references are of record in the file of this patent:

UNITED STATES PATENTS

| Number | Name | Date |
|---|---|---|
| 2,103,299 | Ramsbeck | Dec. 28, 1937 |